US009533270B2

(12) United States Patent
Law et al.

(10) Patent No.: US 9,533,270 B2
(45) Date of Patent: Jan. 3, 2017

(54) PASSIVE INJECTION OF A CHEMICAL SOLUTION INTO A PROCESS STREAM

(71) Applicants: Robert James Law, Livermore, CA (US); Robert L Cowan, Livermore, CA (US); Thomas P Diaz, San Martin, CA (US); Samson Hettiarachchi, Menlo Park, CA (US)

(72) Inventors: Robert James Law, Livermore, CA (US); Robert L Cowan, Livermore, CA (US); Thomas P Diaz, San Martin, CA (US); Samson Hettiarachchi, Menlo Park, CA (US)

( * ) Notice: Subject to any disclaimer, the term of this patent is extended or adjusted under 35 U.S.C. 154(b) by 90 days.

(21) Appl. No.: 14/298,191

(22) Filed: Jun. 6, 2014

(65) Prior Publication Data
US 2014/0360606 A1 Dec. 11, 2014

Related U.S. Application Data

(60) Provisional application No. 61/833,191, filed on Jun. 10, 2013.

(51) Int. Cl.
*B01F 15/04* (2006.01)
*B01F 5/04* (2006.01)
(Continued)

(52) U.S. Cl.
CPC ......... *B01F 15/0412* (2013.01); *B01F 5/0495* (2013.01); *G05D 11/006* (2013.01); *F16K 19/003* (2013.01); *Y10T 137/2218* (2015.04)

(58) Field of Classification Search
CPC .............. F16K 19/003; Y10T 137/2218; E21B 43/166; G05D 11/006; G21C 1/08; G21C 1/10; B01F 15/0412; B01F 5/0495
(Continued)

(56) References Cited

U.S. PATENT DOCUMENTS 1,736,803 A * 11/1929 Shields .................. E03C 1/046
　　　　　　　　　　　　　　　　　　　　137/564.5
1,946,474 A *  2/1934 Banks ..................... C02F 1/686
　　　　　　　　　　　　　　　　　　　　137/564.5
(Continued)

FOREIGN PATENT DOCUMENTS

IR WO 2010030227 A1 * 3/2010 ............ B01F 3/0865

OTHER PUBLICATIONS

S.Hettiarachchi, The On-Line NobleChem Application Experience in an Operating BWR,International Conference on Water Chemistry of Nuclear Reactor Systems, Jeju Island, South Korea, Oct. 23-26, 2006.
(Continued)

*Primary Examiner* — Mary McManmon
*Assistant Examiner* — Richard K Durden

(57) ABSTRACT

A system and method of injecting a chemical into a high pressure process stream without pumps or other active components. The system utilizes the differential pressure created by resistive losses of downstream components within a high pressure process stream. A bypass side stream is taken from an upstream pressure location and returned to the downstream side of the resistive inline process component. The chemical solution vessel is pressurized by the higher side of the pressure differential. The solution then passes through a flow controlling capillary tube exiting on the lower pressure differential side into the bypass stream. The high flow rate chemically diluted bypass stream then returns to the process stream at the lower differential process stream tie-in. The chemical solution is isolated from the process water pressuring the vessel by a movable separating device preventing mixing of the two fluids. The vessel can also be pressurized by gas.

17 Claims, 8 Drawing Sheets

(51) Int. Cl.
  *G05D 11/00* (2006.01)
  *F16K 11/00* (2006.01)

(58) Field of Classification Search
  USPC .................................................. 137/564.5
  See application file for complete search history.

(56) References Cited

U.S. PATENT DOCUMENTS

| | | | | | |
|---|---|---|---|---|---|
| 2,058,309 | A | * | 10/1936 | Haering | G05D 11/006 |
| | | | | | 137/205.5 |
| 2,266,981 | A | * | 12/1941 | Miller | B01D 53/26 |
| | | | | | 48/190 |
| 2,310,051 | A | * | 2/1943 | Baer | C02F 1/686 |
| | | | | | 137/564.5 |
| 2,681,149 | A | * | 6/1954 | Shuldener | B01F 5/0495 |
| | | | | | 137/115.02 |
| 3,004,548 | A | * | 10/1961 | Janes | B01F 5/0495 |
| | | | | | 137/100 |
| 3,040,774 | A | * | 6/1962 | Stenberg | C02F 1/686 |
| | | | | | 137/564.5 |
| 3,224,637 | A | * | 12/1965 | Muller | B01F 5/0495 |
| | | | | | 222/334 |
| 4,905,497 | A | * | 3/1990 | Shindo | B01F 3/02 |
| | | | | | 137/606 |
| 6,779,548 | B2 | | 8/2004 | McKeary | |
| 8,054,933 | B2 | | 11/2011 | Tran | |

OTHER PUBLICATIONS

S.E.Garcia, Bwr Chemistry Control Status: A Summary of industry Chemistry Status Relative to the BWR Water Chemistry Guidelines, Nuclear Plant Chemistry Conference 2010, Quebec City, Canada, Oct. 2010.

P.L.Andresen, Developments is SCC Mitigation by Electrocatalysis, 15th International Conference on Environmental Degradation of Materials in Nuclear Power systems—Water Reactors, Colorado Springs, CO, Aug. 7-11, 2011.

* cited by examiner

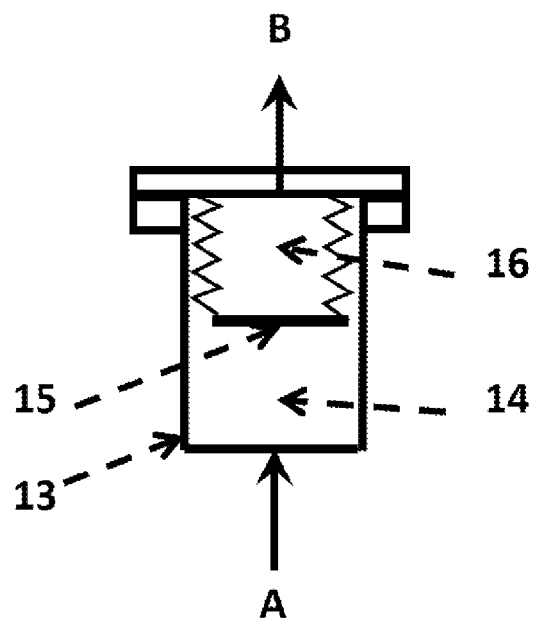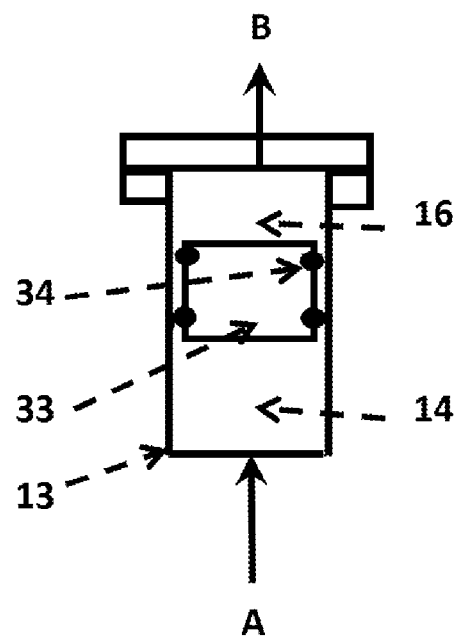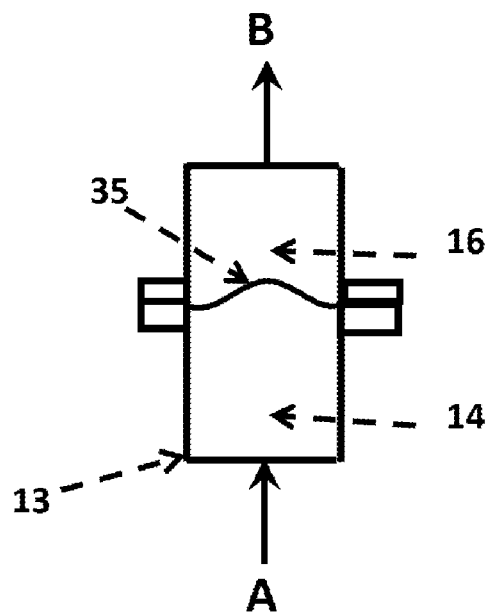

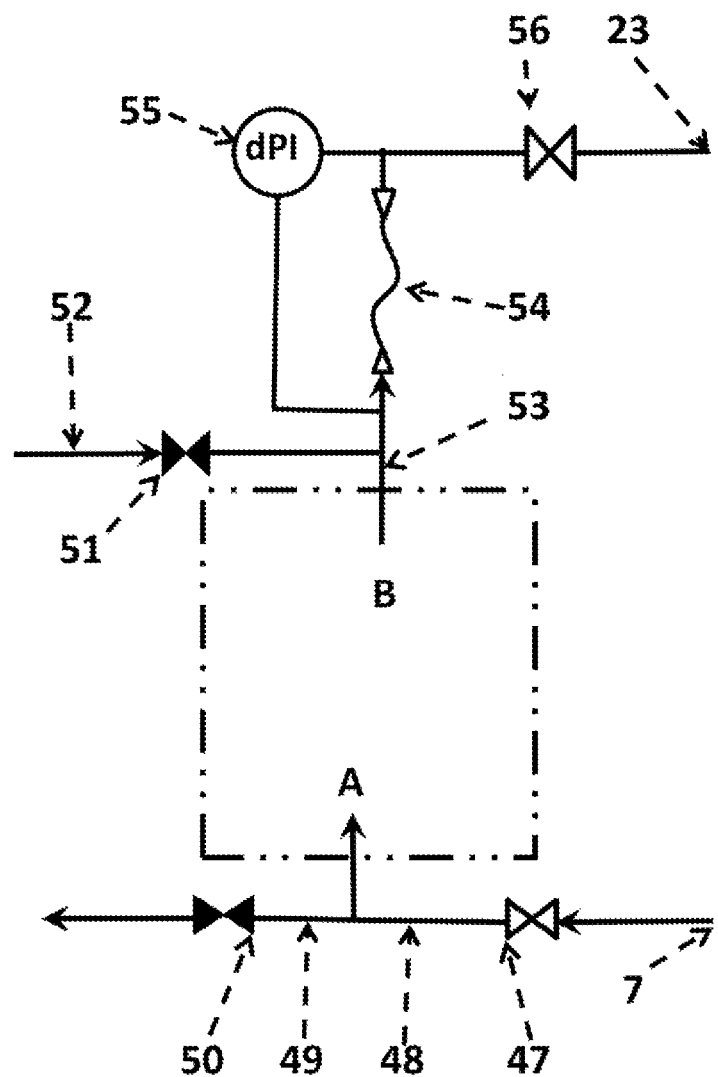

PASSIVE INJECTION OF A CHEMICAL SOLUTION INTO A PROCESS STREAM

TECHNICAL FIELD OF THE INVENTION

This invention relates to a method and process for injecting a chemical solution into a flowing, pressurized fluid stream.

BACKGROUND

In various industries such as the power generation industry, there is a need to inject chemical solutions into flowing process streams at elevated pressures and temperatures for various purposes. In particular, it is necessary to inject solutions of noble metal containing chemicals, such as $Na_2Pt(OH)_6$, into the feedwater piping of boiling water nuclear reactors to aid in inhibiting intergranular stress corrosion cracking of susceptible structural materials in the reactor vessel in the presence of hydrogen.

As reported by Hettiarachchi and Diaz, the noble metal chemical solution $Na_2Pt(OH)_6$ is added to the feedwater piping of boiling water nuclear reactors over a 10 day period. Such 10 day injection periods are repeated during each subsequent yearly fuel cycle. For boiling water nuclear reactors with longer fuel cycles, the 10 day applications are conducted on an annual basis. The total mass of noble metal injected annually is also limited to a fixed value by an industry consensus standard described by Garcia et al. Because of a phenomenon known as "crack flanking", described by Andresen and Kim, it is advantageous to inject the noble metal chemical over the entire operating period of a fuel cycle, not just during an annual 10 day period. Active metering pumps used for these 10 day injections, such as positive displacement pumps, have experienced maintenance problems due to interaction with the noble metal chemicals such as $Na_2Pt(OH)_6$ and are not optimum for long term injection.

A boiling water nuclear reactor that follows the industry consensus recommendation will typically add between 200 and 1,200 gm of Pt (as $Na_2Pt(OH)_6$) each calendar year, depending on plant specific features such as fuel surface area and power rating. If the addition is made continuously at a constant rate over 365 days, the addition rate will vary between $3.8 \times 10^{-4}$ and $2.3 \times 10^{-3}$ gm (Pt)/min. If the feedstock is a 1% solution of $Na_2Pt(OH)_6$, the addition rate will be between 0.038 and 0.23 ml/minute (cc/m). The resulting concentration of Pt in the feedwater would be on the order of 10 parts per trillion. Accordingly, there has been a need in the nuclear industry for a chemical injection system that does not employ active pumps and is capable of adding small, metered amounts of noble metal chemicals, such as $Na_2Pt(OH)_6$, into the feedwater during the entire fuel cycle.

U.S. Pat. No. 8,054,933 (Tran et al) describes a method of injecting chemicals into flowing nuclear reactor water streams teaching the use of positive displacement pumps, a process computer, various valves, chemical storage tanks, weighing scales and a source of deionized water. While this system is useful in injecting chemicals over short periods of time, it is quite complicated and not necessarily suited for trouble free injection of dilute solutions over longer periods of time.

U.S. Pat. No. 2,266,981 (Miller) discloses a method and apparatus for injecting chemicals into a natural gas pipeline operating at elevated pressures that does not use a pump. The apparatus teaches a fluid supply for storing the chemical to be injected, a pressure feed tank for pressurizing and injecting the chemical into the pipeline and a series of lines, manual valves and gauges for controlling the flow of chemicals from the supply tank into the feed tank and ultimately into the pipeline using gravity. The natural gas line pressurizes the pressure feed tank to the same pressure as the gas in the pipeline and gravity allows the solution in the pressurized tank to flow into the gas pipeline. This arrangement would not work in adding low flow rates of chemicals into a flowing water filed pipe; as the pressurizing gas above the liquid in the feed tank would eventually become saturated. Degassing of the feed solution within the flow restrictor (valve, capillary) would occur and alter the rate of injection precision. An active flow rate control is required to maintain a constant injection rate as the change in height of the feed solution drains the tank. U.S. Pat. No. 6,779,548 (McKeary) teaches a similar method as U.S. Pat. No. 2,266,981 (Miller) but adds a system for automatically controlling the quantity of chemical injected into a pressurized gas system by employing two tanks, one pressurized and one not pressurized. While this system could work well adding liquid to a gas process stream, it will not control a liquid addition to a liquid stream to the accuracy and precision required for very low flow rates required in Pt injection nuclear applications. Similar problems will occur as with U.S. Pat. No. 2,266,981 (Miller)

All injection patents researched for this application have some sort of active displacement component, do not account for dilution of the primary injection solution, have cover gas pressurization (that saturate the chemical injection solution), have active flow controls, or cannot yield very low flow rates (sub ccm) continuously over very long periods (months-year) without intervention.

SUMMARY OF THE INVENTION

A reliable method of injecting small, accurate amounts of a chemical solution into a flowing process stream over long periods of time without the use of pumps is desired by some industries. Described herein is such a chemical injection system and method that uses the pressure drop in a process line as the motive force acting on a variable volume reservoir coupled with a passive, calibrated capillary tubing element to accurately control and meter the additions of a chemical into a liquid process stream at a location of lower pressure within the same line. The system is located in the process line where resistive components create pressure losses as the process fluid passes through, such as before and after a heat exchanger. The amount of solution injected by the system is determined by one control valve and a differential pressure meter measuring the fluid pressure differential location immediately before and immediately after the capillary tubing element. A method is also described in which a pressurized gas, rather than the higher pressure location of the process stream, provides the motive force acting on the variable volume reservoir. In both cases, a bypass stream taken from a high pressure portion of the process stream and introduced into a lower pressure location of the process stream is integral to the invention. The overall advantage of the process is to continuously and passively add metered amounts of a chemical solution in amounts as low as or lower than 0.01 milliliters per minute over periods of over 12 to 24 months.

BRIEF DESCRIPTION OF THE DRAWINGS

FIG. 1 has the solution flow control capillary tube at the exit from the pressure vessel.

FIG. 1 A is the pressure vessel with a bellows separator 15.

FIG. 1 B is the pressure vessel with a piston separator 33.

FIG. 1 C is the pressure vessel with a membrane separator 35.

FIG. 1 D is a single exit stream with a flow control valve 28.

FIG. 1 E are duel path exit streams with flow control valves 28 and 40.

FIG. 1 F is a single flow stream with a flow control orifice 45.

FIG. 1 G are duel path exit streams with flow control orifices 45 and 57.

FIG. 5 is a schematic representation of the optional embodiment of a system of passive injection of a chemical solution into a process stream in accordance with the present invention. Whereas the schematic in FIG. 1 has only one chemical subsystem between location tees 7 and 23, this embodiment adds a second chemical subsystem attached at location 7 and 23.

DETAILED DESCRIPTION

The system and method according to the present invention will be described in the context of injection of $Na_2Pt(OH)_6$ into the feedwater of a boiling water nuclear reactor. This is done for purposes of illustration only and is not intended in a limiting sense. The system and method of the present invention are equally suitable for use in other industries in which low flow rates of chemicals must be dispensed with a high level of accuracy without any active components, such as metering pumps.

Figure 1:
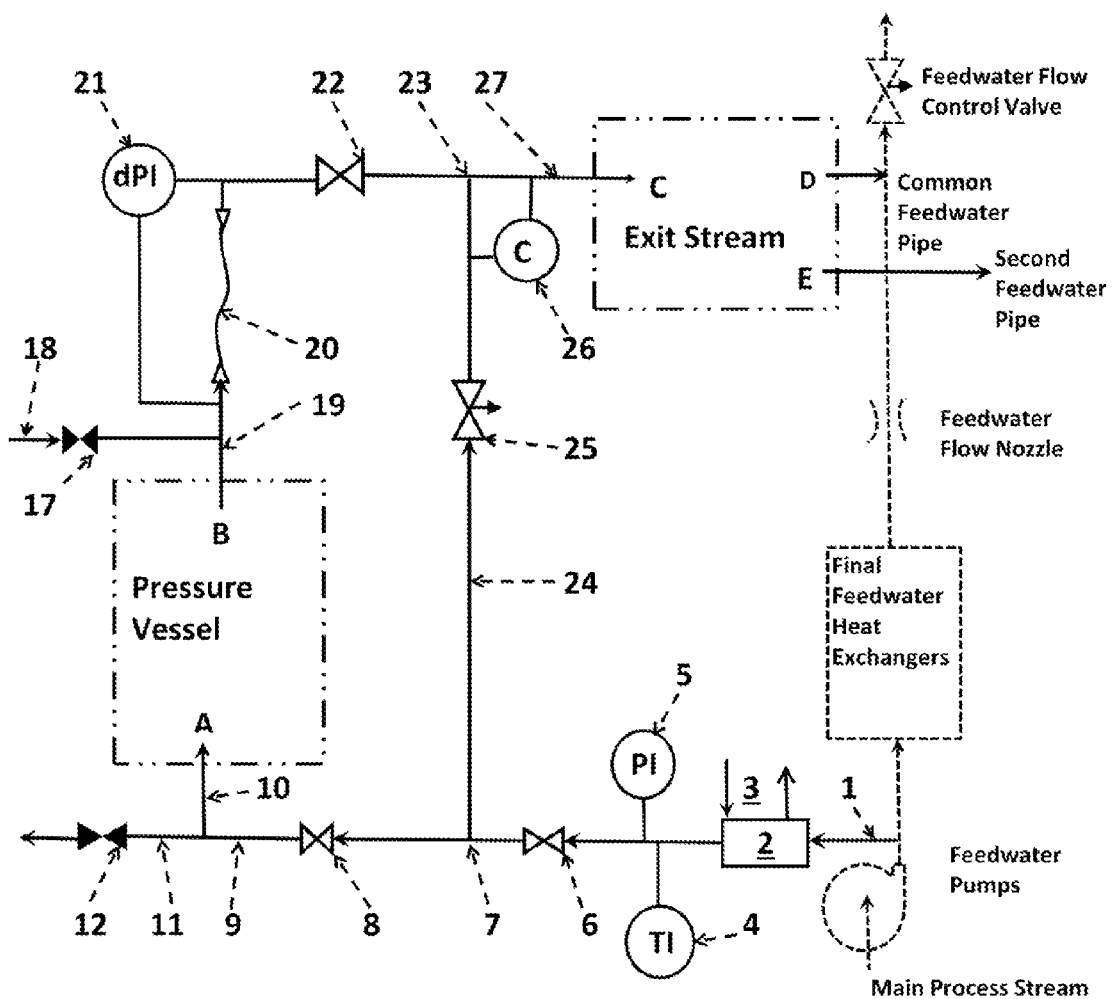
FIG. 1 is a schematic representation of the first embodiment of a method of passive injection of a chemical solution into a liquid process stream in accordance with the present invention. A box is drawn into FIG. 1 to indicate the optional configurations of the pressure vessel separators as shown in FIG. 1 A, a bellows, FIG. 1 B, a piston and FIG. 1 C, a membrane. A second box is drawn into FIG. 1 to indicate the optional configurations of the exit streams shown in FIG. 1 D, the exit flow controlled by a flow control valve, FIG. 1 E, the exit flow controlled by two flow control valves, FIG. 1 F, the exit flow controlled by a single orifice and FIG. 1 G, the exit flow controlled by two orifices.
Figure 1:
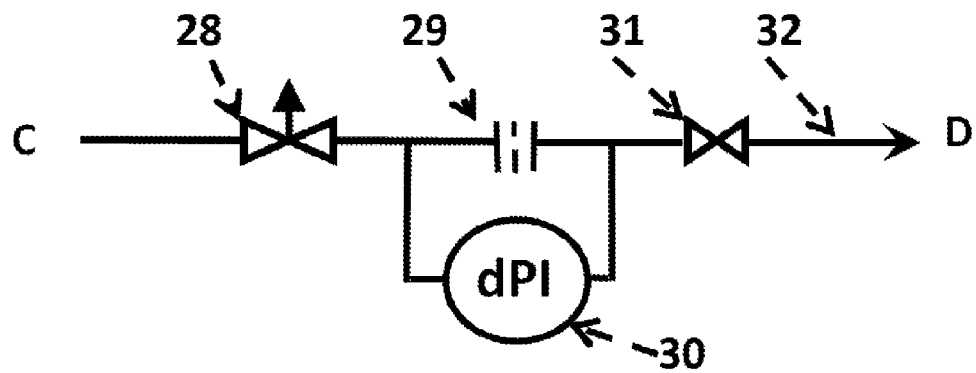
Figure 1:
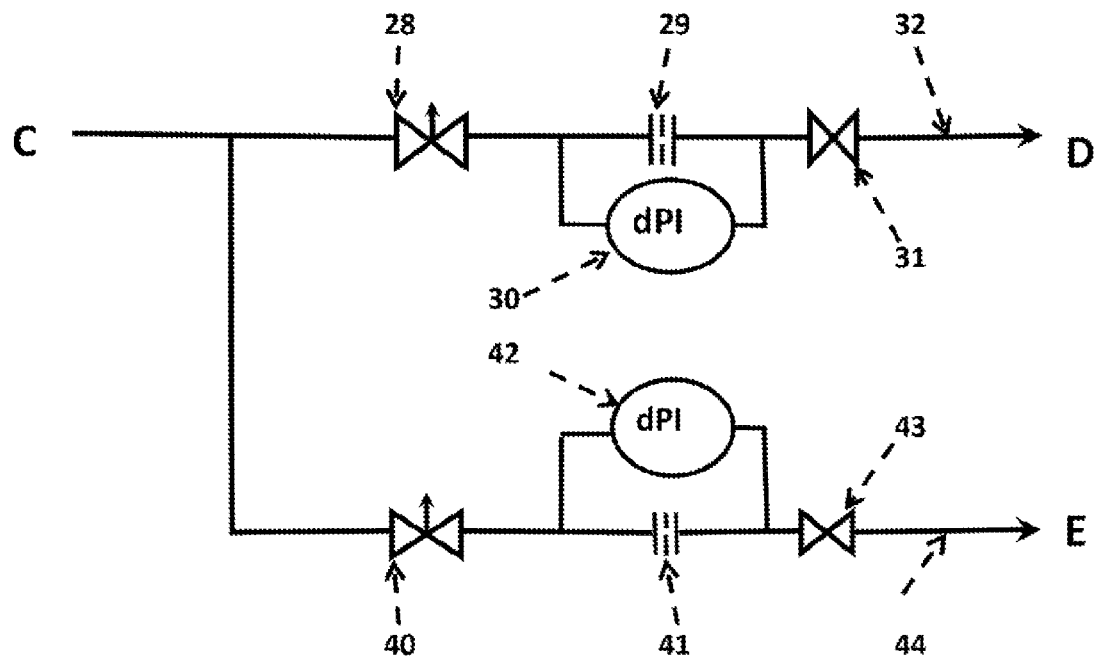
Figure 1:
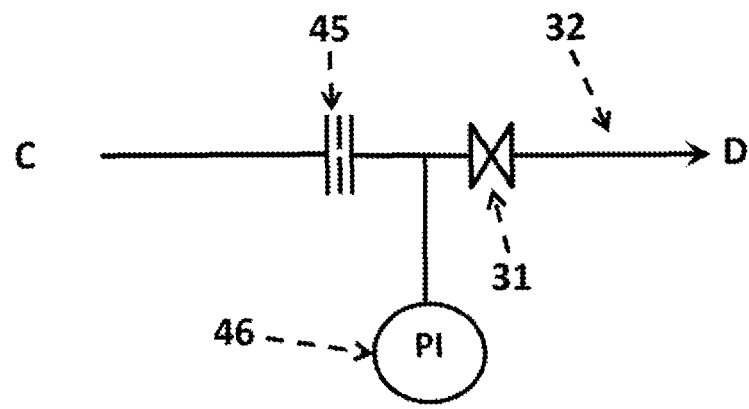
Figure 1:
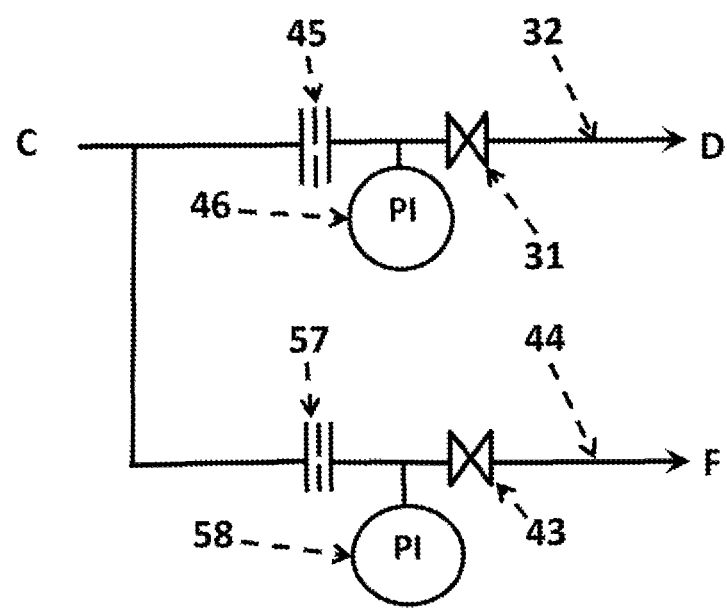
Figure 2:
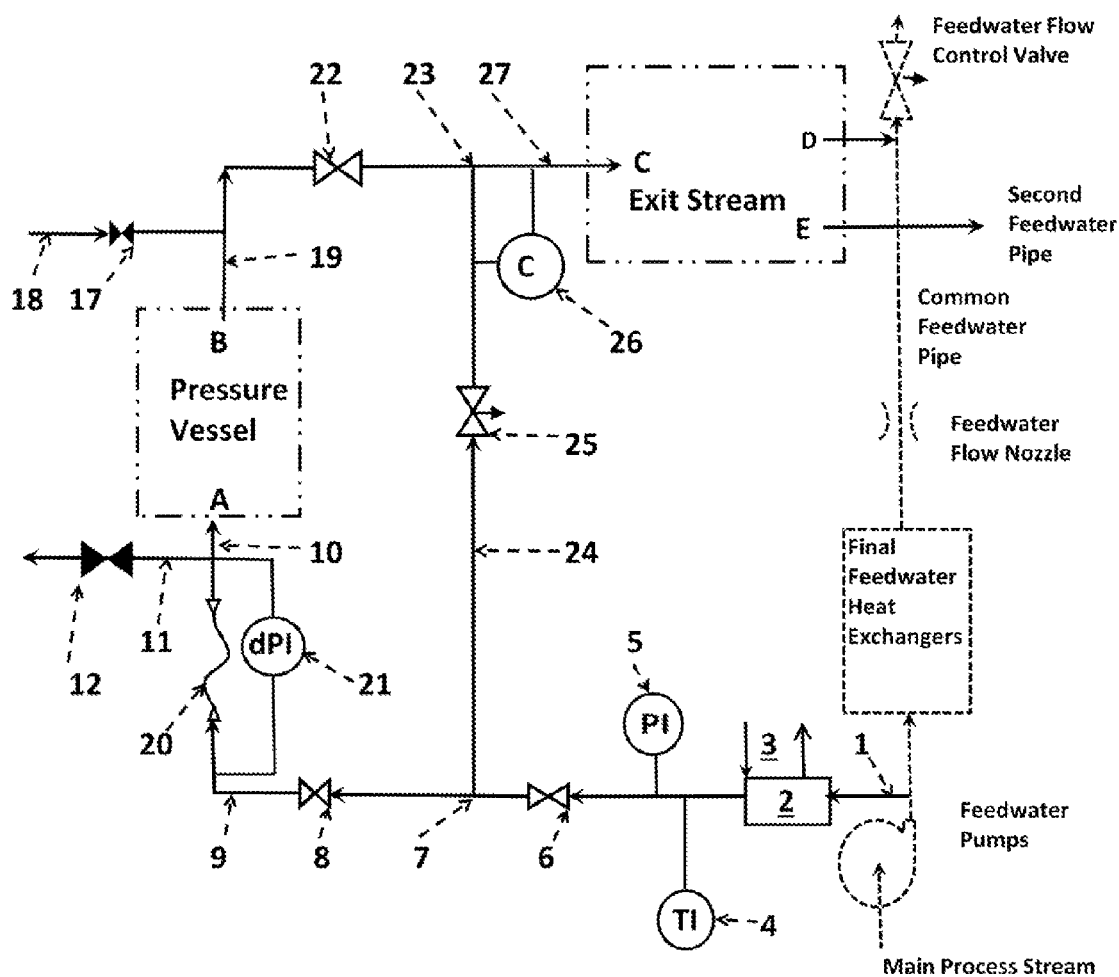
FIG. 2 is a schematic representation of another embodiment of a method of passive injection of a chemical solution into a liquid process stream in accordance with the present invention. It is similar to the system of FIG. 1, but has the solution flow control capillary tube at the entrance of the pressure vessel.
Figure 3:
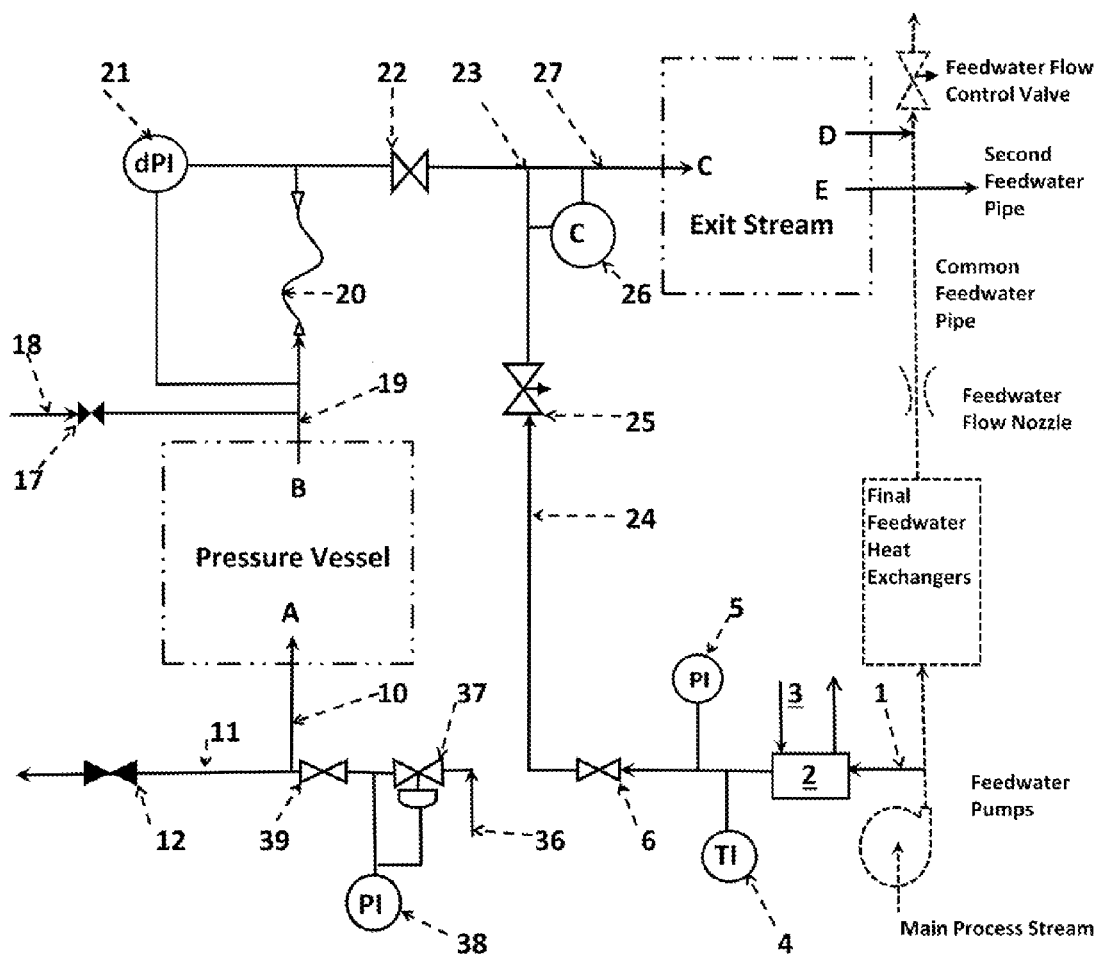
FIG. 3 is a schematic representation of another embodiment of a method of passive injection of a chemical solution into a liquid process stream in accordance with the present invention. It is similar to the system of FIG. 1, but has a gas supply pressurizing the pressure vessel instead of the liquid pressurizing source with the solution flow control capillary tube at the exit of the pressure vessel.

The FIG. 1, FIG. 2 and FIG. 3 have two boxes within the drawings where optional configurations are presented for the pressure vessel separators as shown in FIG. 1 A, FIG. 1 B or FIG. 1 C connected at locations A and B along with optional configurations presented for the flow control for single or double stream paths exiting the system through FIG. 1 as shown in FIG. 1 D, FIG. 1 E, FIG. 1 F or FIG. 1 G connected at locations C, D and E.

First Embodiment

Structure

Referring to FIG. 1, a first embodiment of a method for passive injection of a chemical solution into a high pressure process stream system in accordance with the present invention generally includes the basic concepts that follow. The main process stream, to which the chemical is to be injected is represented by the dashed lines located on the right side of FIG. 1, called the feedwater system, is not a part of the embodiment. The injection system is comprised of a bypass stream line 24 and a chemical injection branch 19. The high flow (1 to 10 liters/min) bypass loop starts at the system inlet 1 and consists of a heat exchanger 2 (which is cooled by service water 3), an isolation valve 6, a capillary pressure control valve 25, exiting through the Exit Stream box configuration as shown in FIG. 1D, FIG. 1E, FIG. 1 F or FIG. 1 G.

There are four configurations for flow through the exit stream. FIG. 1 D is a single stream entering at location C and passing through flow control valve 28, flow orifice 29, isolation valve 31, exiting through line 32 at location D. FIG. 1 E is a two path configuration utilizing the same path as FIG. 1 D and including the second path through flow control valve 40, orifice 41, isolation valve 43, exiting through line 44 at location E. FIG. 1 F is a single stream entering at location C and passing through flow control orifice 45, isolation valve 31 exiting through line 32 at location D. FIG. 1 G is a two path configuration utilizing the same path as FIG. 1 F and including the second path through flow control orifice 57, isolation valve 43, exiting through line 44 at location E.

A second path of the first embodiment is through the chemical injection branch starting at junction 7 and consisting of an isolation valve 8, a tee separating flow paths 9, 11 and 10, a pressure vessel vent valve 12, a pressure vessel entering at location A as shown in FIG. 1 A, FIG. 1 B or FIG. 1 C, exiting at location B line 19, a chemical filling valve 17 from a chemical source at 18, a capillary tube 20, a differential pressure gauge 21 and an isolation valve 22 attached to junction 23.

There are three types of separators within the pressure vessel 13. FIG. 1 A shows the bellows 15 separating the pressurizing fluid 14 from the chemical solution 16. FIG. 1 B shows the piston 33 with O-rings seals 34 separating the pressurizing fluid 14 from the chemical solution 16, FIG. 1 C shows the membrane 35 separating the pressurizing fluid 14 from the chemical solution 16.

There are monitoring devices in the bypass loop, a temperature indicator 4 and a pressure gauge 5 located immediately downstream of the heat exchanger, a differential conductivity meter 26 (with inputs immediately before and after the tee junction 23 between valves 25 and 28), and the various pressure gauges associated with FIG. 1 D a differential pressure meter 30 located with inputs before and after the bypass flow metering orifice 29, FIG. 1 E the path shown in FIG. 1 D and the second path which includes a differential pressure gauge 42 with inputs before and after the bypass flow metering orifice 41, FIG. 1 F a pressure gauge downstream from the flow controlling orifice 45, and FIG. 1 G which includes the pressure gauge in FIG. 1 F and a second pressure gauge after flow control orifice 57.

First Embodiment

Operation

Figure 4:
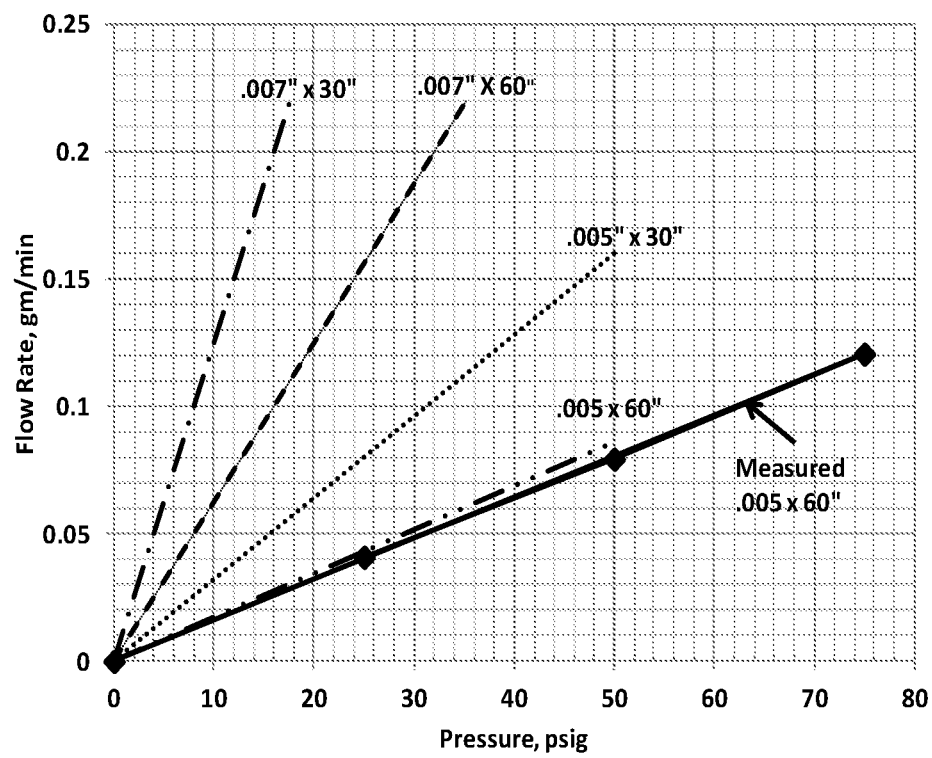
FIG. 4 is plot of capillary tubing flow rates versus pressure drop calculated with Poiseuille's Law for internal diameters of 0.005" and 0.007" and lengths of 30" and 60". The dashed lines within the plot are the results of the calculations using Poiseuille's Law. A calibration measurement was conducted on a 0.005" by 60" capillary tube and is shown also on FIG. 6 as the solid plotted line. The correlation between the calculated 0.005"×60" rate and measured rate at 50 psig indicates that the application of capillary flow control is valid.

Embodiment one in FIG. 1 incorporates common features of this injection system seen also in embodiments two through three herein. They are:
 a. The bypass stream 24 developed from a higher pressure process stream location 1, for example at the process feedwater pump exit, to a lower pressure process stream location further downstream 32, such as after a pressure loss through a process component such as a heat exchanger and flow nozzle. The bypass water is first conditioned by a heat exchanger 2 with service water 3 or optional cooling water on the secondary side. Valves 6 and 31 are used to isolate the injection system when necessary. The flow rate in the bypass stream line 24 is affected by the restrictions in the bypass stream including the heat exchanger 2, the isolation valves 6 and 31, the capillary pressure control valve 25, the and the hardware items located in the exit box streams. The major control restrictions are the capillary pressure control valve 25 and the bypass stream control orifices. The desired flow rate in line 32 is controlled and monitored with a calibrated flow metering valves 29 and 41 or orifices 45 and 57.
 b. The second common feature of these injection systems is the chemical solution injection subsystem tee junction 7 through the tee junction 23 which contains the pressure vessel 13 and the capillary flow restrictor 20 that controls the rate of chemical injected into the bypass stream. The pressure vessel is pressurized with the liquid obtained from the bypass stream at the tee junction 7. A separator 15 inside the pressure vessel prevents the pressurizing fluid 14 from mixing with the chemical solution 16 located on the other side of the separator. The separator moves within the pressure vessel 13 such that the pressure on both sides is the same, that is, both the pressuring fluid 14 and chemical solution 16 are at the same pressure. Valve 25 controls the pressure drop across the capillary flow control device 20 since the pressure at line 19 is the same as at location line 24 and the capillary exit pressure and valve exit pressure are the same at the tee junction 23. The chemical solution 16 from the chemical solution subsystem at the tee junction 7 through tee junction 23 is diluted as it flows into the bypass stream at the tee junction 23. The transit time of the chemical solution from tee junction 23 to the feedwater injection tap through line 32 is minimized by the high bypass flow rate, thus minimizing the potential of premature $Na_2Pt(OH)_6$ thermal degradation and Pt deposition in undesired locations. To provide the low flow rates required for $Na_2Pt(OH)_6$ chemical additions to boiling water nuclear reactor applications, a capillary solution flow control device 20 made of small diameter capillary tubing is located at either the exit of pressure vessel 13 in FIG. 1 and FIG. 3 or at the entrance of pressure vessel 13 in FIG. 4. To verify the proper flow rate is being accomplished, a differential pressure measurement 21 is made across the capillary tube 20 and compared to the capillary calibration behavior for the particular capillary being used. An example of a capillary verification behavior chart is shown in FIG. 4. Poiseuille's Law was used to calculate the flow rate of water at different pressure drops, tubing lengths (30" and 60") and tubing internal diameters (0.005" and 0.007"). A tube of 0.005" internal diameter by 60" long was tested for flow versus pressure drop. The measured values are plotted (solid line) and compared to a Poiseuille's Law calculation (dotted line) and compare very well in FIG. 4. Poiseuille's Law for flow is proportional to the length and to the fourth power of the radius. Other capillary diameters and lengths are plotted in FIG. 4 as dotted lines. This plot indicates the potential flow rates of chemical solution required over the expected process stream flow rates (0.03 ccm to 0.25 ccm) are easily accomplished with capillary tubing. Other flow rates can be accomplished with smaller or larger capillary internal diameters and lengths.

In addition to the normal chemical injection operation of the system, there are two other procedures necessary: 1) the initial start-up of the system and 2) subsequent refilling of the vessel after an operational period. Both procedures require the chemical injection subsystem be isolated from the bypass stream by closing valves 8 and 22. Both procedures require ambient pressure conditions. The initial start-up will require filling pressuring fluid volume 13 with high purity water via valve 12 and fill line 11 and then the chemical solution volume 16 with the chemical solution to be added utilizing solution fill line 18 and valve 17. Once the two volumes are completely full (no air gaps), the fill 17 and vent isolation 12 valves can be closed.

The refill procedure is simpler since there should be no air pockets after the initial operating period. The liquid pressuring fluid 14 only needs to be vented via valve 12 while the chemical solution is transferred into the upper chamber 16 until the separator 15 is fully extended. Once the chemical solution chamber 16 is full the fill 17 and vent 12 valves should be closed.

After the initial filling or after subsequent refills, the isolation valves 8 and 22 of the injection subsystem can be opened slowly. If the bypass stream is flowing, the chemical solution will start to flow. If the bypass stream is off-line, as soon as the system is placed into service the chemical solution will start to flow.

To place the system into service, start with valves 6, 25, 28 and 29 closed. Start the service water flow 3 to the heat exchanger 2 then fully open the isolation valves 6 and 31. Slowly open the capillary flow control vale 25 and bypass flow control valve 28 while maintaining a vigil of the temperature 4 exiting the inlet heat exchanger. Open both flow control valves 25 and 28 until the desired capillary differential pressure 21 and bypass differential pressure 30 are obtained. Some iteration of the valve positions may be required, since the two control points and flow rates are not independent. Using the desired chemical solution flow rate, the desired capillary tube differential pressure gauge value is determined from the correct capillary tube diameter/length line from a plot like that shown in FIG. 4.

After a period of time, the measured differential conductivity 26 should indicate that chemical is being injected. The downstream conductivity value, after tee junction 23, should be higher than the bypass water, after valve 25. The measured difference can be corroborated by knowing the solution chemical ionic properties, the chemical solution injection rate and the bypass flow rate. A monitoring delay time is necessary to allow the temperature and flow transients to dissipate.

Second Embodiment

Structure

Referring to FIG. 2 shows the second embodiment similar to that shown in FIG. 1 except that the capillary solution flow control 20 is located just after 9 and before the pressure vessel entrance at location A of the pressure vessel box. The capillary differential pressure gauge 21 has input lines located after isolation valve 8, on line 9, and between the capillary tube output on line 10 the pressurizing fluid 14, the pressure vessel 13, the chemical solution 16, the vent/drain line 11, valve 12, solution fill line 18 and fill valve 17 remain schematically the same.

Second Embodiment

Operation

All of the operation procedures for the second embodiment, shown in FIG. 2, are the same as the operation procedures for the first embodiment. The only difference being the location of the capillary flow control tube 20 and the capillary pressure differential gauge 21 at the entrance of the pressure vessel. The second embodiment utilizes the principals of hydrodynamics and incompressible liquids. Since the pressure vessel 13 is filled with liquids, for both the pressuring fluid 14 and chemical solution 16, the flow rate entering the vessel equals the flow rate out of the vessel. This embodiment can also be utilized in operational embodiments FIG. 1 without any procedural changes.

Third Embodiment

Structure

Referring to FIG. 3, the third embodiment is similar to that in FIG. 1 except that a high pressure gas supply 36, rather than the water from the bypass loop 24, is used to pressurize the pressure vessel 13 in volume 14. The gas pressure 36 is controlled by the pressure regulator 37, which includes a pressure gauge 38. The gas pressurizing fluid enters the pressure vessel 13 through line 10.

Third Embodiment

Operation

The third embodiment, shown in FIG. 3, changes the source of vessel pressurization to that of a high pressure gas supply instead of the liquid supplied by the bypass stream 24, shown in FIG. 1 and FIG. 2 at junction tee 7. This change also alters the chemical supply subsystem isolation during the initial filling and subsequent refilling procedures. Embodiment three will not work with embodiment two, where the capillary flow control 20 is in line 10 at the vessel 13 entrance.

The initial and subsequent filling of the vessel is accomplished by closing the high pressure gas supply at valve 39 and the chemical injection valve 22. With valve 12 in the open position the chemical solution is added via line 18 through the open valve 17. When sufficient chemical solution has been added to the chemical solution reservoir 16, valve 17 and valve 12 are closed. The pressure regulator 37 is then set to the desired initial gas pressure on gauge 38. Valve 39 is then opened. Valve 22, where the chemical solution is injected into the bypass stream, is then opened. If not already open, valves 1 and 32 are opened. The capillary tube pressure control valve 25 is set to wide open (in embodiment three there is no initial need to adjust the capillary tube pressure control valve 25 to obtain the desired chemical solution flow rate). The desired capillary tube differential pressure gauge value 21 is obtained by adjusting the pressure regulator 37 to obtain the desired differential pressure across the capillary flow device 20. The downstream pressure of the capillary tube flow control device is the pressure measured at pressure indicator 5. Thus the differential pressure drop across the capillary tube flow control device 20 is the difference between pressure gauge 38 and pressure gauge 5. The bypass flow controls in the exit stream are used to set the bypass stream flow rate.

Fourth Embodiment

Structure

Referring to FIG. 5, the fourth embodiment is applicable to embodiment one of this invention as an additional chemical second subsystem between lines 7 and 23. Duplicate components of items 8 through 22 in FIG. 1 are duplicated as 47 through 56 and are attached at tee junctions 7 and 23 respectively.

Similar chemical injection subsystem components in embodiment two can be employed as an additional second subsystem and attached to tee junctions 7 and 23 in FIG. 2.

Fourth Embodiment

Operations

The operations of the fourth embodiment is the same as in the embodiments one through three except when isolating one or both of the two subsystems. In general only one of the subsystems would be in operation at a time, although both could be in use at the same time. Two subsystems would allow for continuous chemical injection during refilling operations of the other. Two subsystems would also allow for significantly different injection rates by varying the capillary size (internal diameter and length) on the optional second subsystem.

We claim:

1. A continuous passive injection system for dispensing a chemical solution at a slow, controlled rate into a flowing process stream pressurized by a process stream pump, the system comprising:
   A bypass loop comprising:
      a bypass loop inlet fluidly coupled to the process stream downstream of said process stream pump, having a bypass loop inlet isolation valve;
      a bypass loop outlet fluidly coupled to the process stream downstream of the bypass loop inlet, having at least one bypass loop outlet isolation valve; and
      a pressure control valve located along the bypass loop between the bypass loop inlet isolation valve and the at least one bypass loop outlet isolation valve;
   wherein the fluid pressure in the process stream at the bypass loop outlet is lower than the fluid pressure in the process stream at the bypass loop inlet;
   a chemical injection branch comprising:

a chemical injection branch inlet fluidly coupled to the bypass loop immediately downstream of the bypass loop inlet isolation valve;

a chemical injection branch outlet fluidly coupled to the bypass loop downstream of the pressure control valve and upstream of the at least one bypass loop outlet isolation valve;

a pressure vessel comprising at least one pressure vessel flange and a separator, the separator forming a movable seal within the pressure vessel between a pressurizing fluid portion and a chemical solution portion, the pressurizing fluid portion being fluidly connected to the chemical injection branch inlet and the chemical injection portion being fluidly connected to the chemical injection branch outlet;

a pressure vessel vent line upstream of the pressure vessel, having a vent isolation valve a pressure vessel fill line downstream of the pressure vessel, having a fill isolation valve; and a capillary flow control tube located upstream of the pressure vessel vent line or downstream of the pressure vessel fill line and having a differential pressure gauge;

wherein the rate of chemical injection is controlled by the pressure control valve, which adjusts a differential pressure across the capillary flow control tube, the differential pressure across the capillary flow control tube controlling a differential pressure across the separator, which causes the separator to inject the chemical solution from the chemical solution portion of the pressure vessel into the chemical injection branch outlet, the chemical solution then flows through the bypass loop outlet and into the process stream.

2. The system according to claim 1, wherein the separator comprises a floating piston sealed against the sides of the pressure vessel.

3. The system according to claim 1, wherein the separator comprises a flexible membrane sealed between two pressure vessel flanges.

4. The system according to claim 1, wherein the separator comprises a bellows.

5. The system according to claim 1, wherein the bypass loop outlet further comprises a bypass flow orifice having a pressure gauge.

6. The system according to claim 1, wherein the bypass loop outlet, containing the chemical solution injected by the chemical injection branch, is split into two process lines, each process line containing similar bypass flow control valves, bypass flow orifices, and bypass flow orifice differential pressure gauges, and wherein each process line is fluidly connected to a different process stream.

7. The system according to claim 1, further comprising one or more additional chemical injection branches connected in parallel to provide continuous operation during refilling or to provide different rates of chemical injection.

8. The system according to claim 7, wherein the one or more additional chemical injection branches contain different concentrations of chemical solution or comprise different capillary tube dimensions.

9. The system according to claim 1, wherein the capillary flow control tube is a calibrated capillary flow control tube such that the rate or a range of rates of chemical injection to the process stream for a set pressure differential or range of pressure differentials across the calibrated capillary flow control tube is predetermined.

10. The system according to claim 9, wherein the length and internal diameter of the calibrated capillary flow control tube are configured to provide a desired relationship between the rate of chemical injection and the pressure differential across the calibrated capillary flow control tube.

11. The system according to claim 1, wherein the pressure vessel volume, chemical solution concentration, and rate of chemical injection is selected to provide a continuous injection of chemical solution over a period of greater than two years without requiring refilling of the chemical supply portion of the pressure vessel.

12. The system according to claim 1, wherein the chemical solution contained in the chemical solution portion of the pressure vessel comprises a water-soluble chemical to establish a target value of said water-soluble chemical in the process stream ranging from parts per million to parts per trillion.

13. The system according to claim 1, wherein the chemical solution contained in the chemical solution portion of the pressure vessel comprises a water-soluble, platinum-based chemical to establish a constant, fixed platinum concentration in the final feedwater of a boiling water nuclear reactor of between 1 and 500 parts per trillion by weight over a period ranging from a month to over two years.

14. The system according to claim 13, wherein the chemical solution contained in the chemical solution portion of the pressure vessel comprises between 0.1% and 5.0% $Na_2Pt(OH)_6$.

15. The system according to claim 1, wherein neither the bypass loop nor the chemical injection branch comprise pumps, the driving force of the fluid in the bypass loop and the chemical injection branch being the pressure differential between the bypass loop inlet and the bypass loop outlet, wherein the only moving part during normal, continuous operation of the system is the separator in the pressure vessel.

16. The system according to claim 1, wherein the process stream is a high temperature, high pressure process stream and the concentration of the chemical solution and the flow rate through the bypass loop are selected to reduce the probability of destructive thermal degradation of thermally sensitive chemical compounds in the chemical solution before the chemical solution enters the high temperature, high pressure process stream.

17. The system according to claim 1, wherein the bypass loop further comprises a differential conductivity meter to compare the conductivity of the fluid in the bypass loop before and after injection of the chemical solution.

* * * * *